DATA RECORDING SYSTEM

Filed July 9, 1962

2 Sheets-Sheet 1

INVENTORS.
CECIL P. BARNARD
DONALD H. HEISER
BY
Otto Schmid, Jr.
AGENT

United States Patent Office 3,264,453
Patented August 2, 1966

3,264,453
DATA RECORDING SYSTEM

Cecil P. Barnard, San Jose, and Donald H. Heiser, Los Gatos, Calif., assignors to International Business Machines Corporation, New York, N.Y., a corporation of New York Filed July 9, 1962, Ser. No. 208,424
6 Claims. (Cl. 235—61.11)

This invention relates to apparatus for recording data on a record member and more particularly to apparatus for magnetically recording data one character at a time on a record member.

In the key entry of data on a record member at an irregular rate, some provision must be made to insure that the data is closely packed on the record member. Otherwise, the result will be a waste both of the record member capacity and the processing time of a device which utilizes the record member. Efforts have been made to solve this problem and these efforts have, in the past, required the use of expensive timing control circuits or accurate incrementing devices designed to step the record member a predetermined distance for each key actuation.

It is an object of the invention to provide a novel procedure for recording data on a record member.

It is another object of the invention to provide apparatus which can accept and encode data at the highest speeds attainable on a manual keyboard device.

It is a further object of the invention to provide apparatus which permits data entered at irregular intervals to be recorded compactly on the record member.

It is still another object of the invention to provide apparatus for recording data on a record member which is efficient in operation, of simple construction and relatively inexpensive to build and maintain.

In accordance with the present invention, a relative cyclic scanning motion is provided between a recording device and a record member so that data from a data input means may be recorded on or read from the record member one character at a time on the reverse scans of said motion under control of sensing a reference means on said record member. The reverse scan is a relative motion which causes the recording device to scan the record member in a direction from the end of the record member toward the start.

The foregoing and other objects, features and advantages of the invention will be apparent from the following more particular description of a perferred embodiment of the invention, as illustrated in the accompany drawings.

Figure 1:
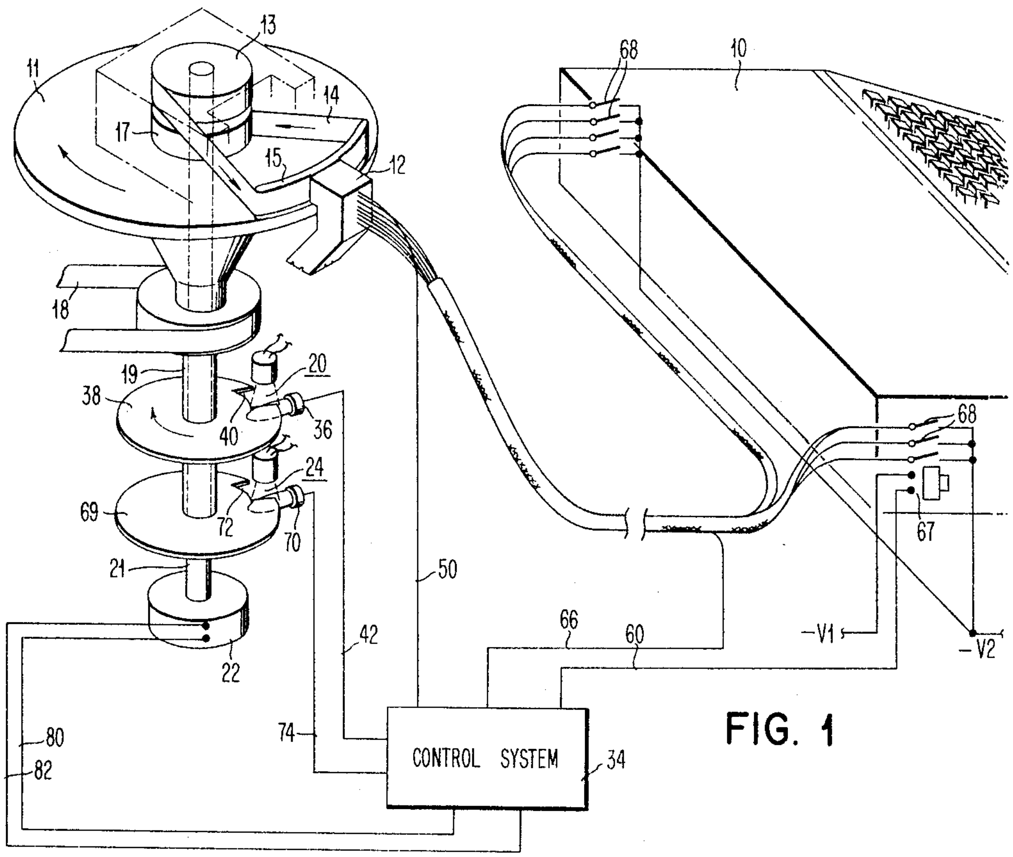
Figure 2:
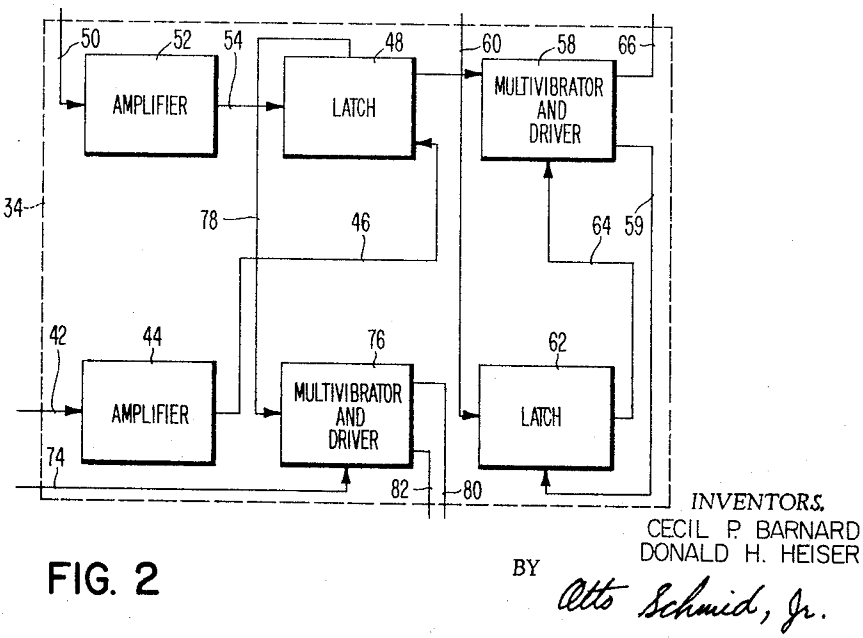
Figures 3, 4, 5, 6:
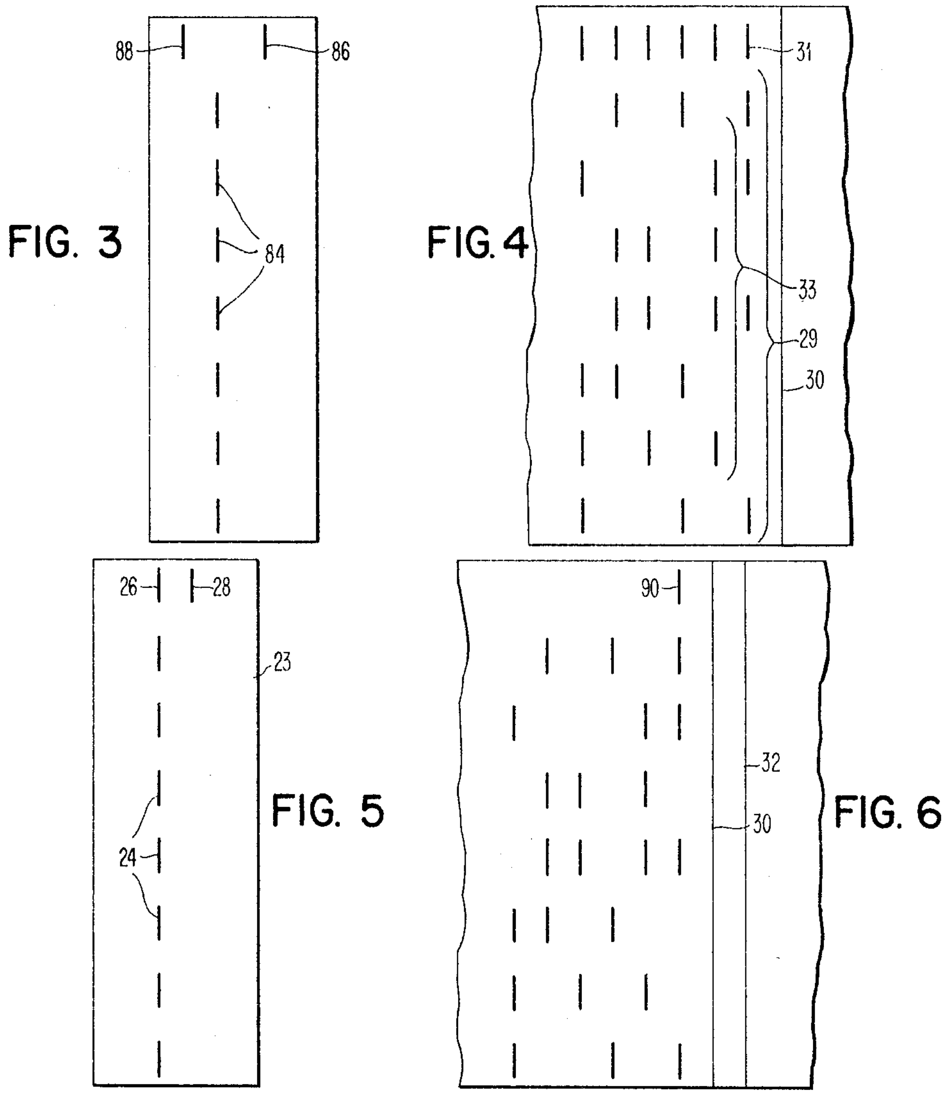

FIGURE 1 is a diagrammatic block diagram of the recording and readback apparatus according to the present invention, FIGURE 2 is a schematic diagram of the control circuity of FIG. 1, FIGURE 3 is a view of an embodiment of the read head assembly of the invention, FIGURE 4 is a view of a typical magnetic tape containing data written in accordance with the invention, FIGURE 5 is a view of an embodiment of the write head assembly of the invention, FIGURE 6 is a view of a typical magnetic tape disposed for readout of the data in accordance with the invention.

Figure 7:
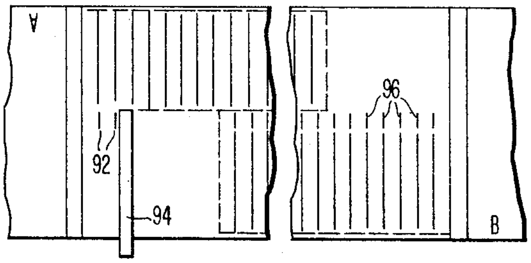

FIGURE 7 is a view of a magnetic tape having data recorded on half the tape at a time in accordance with the invention.

According to the invention, apparatus for one-character-at-a-time magnetic recording and readback of manually entered data is provided. Data is entered upon a manual data entry device which converts the data to a desired code and a control signal for recording upon a record member. A scanning means is provided to produce a cyclical relative motion between the record member and a recording device at a rate greater than the maximum character entry rate. The record member is scanned toward a starting reference mark and a reference mark is made on the record member opposite each character recorded. The recording device comprises a reference mark sensing member and a reference mark recording member. Upon coincidence between a character control signal and a signal generated by sensing the last reference mark on the record member, the recording device is energized to record the data character and a new reference mark.

It can thus be seen that the spacing between data characters on the record member is proportional to the physical spacing between the reference mark sensing member and the reference mark recording member; and, even though the data is entered at irregular intervals, the data is recorded compactly on the record member without the use of a mechanical one-character-space incrementing device or a complex electronic clock timing system.

In the embodiment shown, the apparatus comprises a keyboard entry device 10 for receiving the character data input. The character data input is converted to any desired code in the keyboard entry device, such as one in which the output from the keyboard comprises a signal for each bit position of the code chosen and a control signal. A keyboard of this type is described in copending application Ser. No. 207,213 filed July 3, 1962, entitled Keyboard, by C. P. Barnard and D. H. Heiser, now Patent No. 3,189,153. Each of these signals is coupled to a recording device which comprises a magnetic transducer assembly 12. The transducer is mounted to be operably associated with a record member 14, and the record member is provided with one channel for each of the bit positions of the code chosen plus a control channel. The magnetic transducer assembly is provided with a recording head for each of the code channels of the record member and associated with the control channel is a reference mark read head. In the embodiment shown, the record member is a magnetic tape although the record member could be a disk or a drum. A turntable 11 is mounted on a hollow turntable shaft 19 and the turntable is continuously rotated by drive means 18 to produce a relative motion between fixed-mounted transducer 12 and the magnetic tape 14. The tape is stored in a cartridge (shown dotted in FIG. 1) mounted upon turntable 11. The tape is disposed from a supply reel 13 around a circular guide segment 15 at the edge of the turntable and then to a takeup reel 17. The turntable motion (clockwise in FIG. 1) provides the reverse scan for sensing reference marks since the tape is scanned by the transducer in a direction from the end of the tape toward the start of the tape. A tape drive shaft 21 mounted inside the hollow center of the turntable and turntable shaft provides a means for driving the reels to advance tape across the circular guide segment. A sector locating means 20 is provided to determine when the exposed section of tape is in operative position opposite the magnetic transducer and a tape advancing drive means 22 is provided to advance the tape upon demand from a control circuit. A sensing means 24 is provided to determine when the exposed section of the tape is filled with data so that the tape advancing means may be actuated to advance the tape. The data character bit signals are set up in the keyboard and upon coincidence of the control signal from the keyboard, the signal designating that the exposed section of the tape is opposite the magnetic transducer, and a signal from the reference mark read head, the data is recorded on the tape under direction of control means 34. At the same time, a reference mark is recorded on the control channel of the tape opposite the data bits. The relative motion between the transducer and the record member is such that the transducer scans the tape in the direction from the end of the tape to the start so that the reference mark opposite the last data character recorded will be read first by the reference mark read head.

As indicated above, the record member may conveniently be a magnetic tape and the character bits are recorded in parallel across the tape. The write head assembly 23 (FIG. 5) is a part of transducer assembly 12 and comprises a number of data write heads 24 equal to the number of bits in the chosen code and a write head 26 for the reference track. Separated from the reference track write head 26 is a reference track read head 28 and the spacing between read head 28 and write head 26 is substantially equal to the desired spacing between the characters on the tape. A permanent reference mark 30 is placed on the tape at the start end to initiate recording so that, to record the first character 29 on the tape, the first data that is read by read head 28 will be the reference mark 30. The recording of data is controlled by the circuitry shown in FIG. 2. The sector locating means comprises a photoelectric sensing means 36 and a disk 38 mounted on shaft 19 to rotate synchronously with turntable 11. A slot 40 is provided in a sector of the disk corresponding to the sector of tape around guide 15 upon which data is to be recorded. The disk blocks a beam of light from impinging upon the photoelectric means except when the slot is opposite the photoelectric sensing means. Thus it can be seen that a signal is generated in the photoelectric means only when a part of the sector of tape to be recorded upon is in recording position opposite transducing means 12. The signal is coupled by line 42 into an amplifier 44 and a D.C. output on line 46 is coupled to reset reference mark latch 48. The control signal generated in the keyboard device by switch 67 which denotes that a character is ready to be recorded is coupled by line 60 to the input of a character latch 62 which has been previously reset. A pulse output is generated and this output is coupled by line 64 to partially condition the write single shot multivibrator and driver 58. The signal generated by reading reference mark 30 on the tape is coupled by line 50 to amplifier 52. The output of amplifier 52 is coupled by line 54 to the set input of latch 48. The output of latch 48 is coupled by line 56 to condition multivibrator 58 to generate a WRITE signal. The write signal is coupled over common write line 66 so that the write heads corresponding to those code positions for which switches 68 (FIG. 1) are in the closed position are energized to write data character 29 on the tape. A second output of multivibrator 58 is coupled by line 59 to reset latch 62. Thus it can be seen that a new character will be accepted only after the previous character has been recorded. A new reference mark 31 is also written in the reference track in line with the data character so that on a subsequent scan reference mark 31 will be read first by the reference mark read head and the next character 33 will be recorded on the tape spaced from the first character substantially the distance between read head 28 and write head 26. The character spacing will be somewhat less than the physical distance depending on the speed of the relative motion between the head and the tape and on the amount of time delay in the electronic circuits.

The tape advancing means comprises disk 69 and photoelectric sensing means 70 and this mechanism functions similar to the sector locating means. However, the slot 72 in the disk is positioned to cover only a portion of the tape sector in which data is to be recorded, the last one-third of this sector, for example. Thus, when a reference mark is read in this sector, this means that the exposed section of tape is at least two-thirds filled with data and the tape should therefore be advanced. When the slot is in position a signal is generated in photoelectric means 70, and the signal is coupled by line 74 to the gating input of the single shot multivibrator 76. An output of latch

48 which provides a pulse for each reference mark sensed is coupled by line 78 to condition multivibrator 76. An output will be generated when the gating and conditioning signals are simultaneously present, and this output is coupled over lines 80, 82 to actuate the drive means 22. The drive is of a low speed relative to the scan speed so that the advancing can be accomplished while recording. Thus it can be seen that the tape advancing means is actuated when a reference mark is sensed within the part of the sector covered by the slot 72 in disk 69 and automatically stopped when the tape has been advanced far enough to take the unused tape out of that part of the sector.

In the readback mode, scanning occurs at a rate great enough to feed characters one at a time to some utilization device, such as a card punch or a data processor. For readback, the head assembly (FIG. 3) comprises a set of read heads 84 equal to the number of bits in the character code and in the reference track a reference mark read head 86 is disposed approximately one and one-half character spaces forward of the data read heads and a reference mark write head 88 is positioned approximately one character space behind the data read heads. In the readback of data previously recorded, the reference channel is erased as the tape passes over a narrow, single channel erase head so that the same reference channel is available to be used for flagging each character as it is read back. The tape is scanned in the same manner as in recording and the first data sensed in the flag channel will be the first reference mark 30. When this mark is sensed the data read heads will be actuated to read data into the utilization device; thus it can be seen that the data gates are open one-half character space in front of the character to be read to allow for possible timing variations. When a second permanent reference mark 32 is sensed, the character transfer circuits are gated off so that the data channels to the utilization device are closed one-half character space beyond the character being read. One-half character space time later the data read heads 84 are in position to sense the next character, which in this case will be reference mark 30. This character will not be transferred since the character transfer circuits are gated off; however, its sensing is used to signal the reference mark write head 88 one bit space behind to record a new reference mark 90. This new reference mark will be opposite the character just transferred out to the utilization device in the cycle. Read back of data continues in the same manner on subsequent scans with the last recorded reference mark serving as a guide to denote the last data character read.

Error correcting means may be provided for the correction of operator detected errors. Three kinds of errors can be corrected by the error correcting means—single character errors, field errors or errors at any place within the last full or partial record. The keyboard is equipped with a key for each type of error. When the operator erroneously keys a character and stops before keying a subsequent character, the character error key is depressed. The correct character is then recorded and keying of subsequent characters then proceeds. The error key causes a unique error code to be recorded on the magnetic tape adjacent the erroneous character. In the same manner, a unique pattern corresponding to the field error mark and the record error mark are provided. In playing back the record a character at a time, since the scanning of the tape is accomplished in a reverse direction, the head comes to the unique error correction pattern before it comes to the actual erroneous character. Circuitry is provided for stopping the playback of the erroneous character and also provide that neither the erroneous character nor the unique correction pattern will be transferred to the utilization device. Thus, it can be seen that error characters are not actually erased, but the playback circuitry is designed so as to accomplish the equivalent effect by ignoring the erroneous data as designated by the error correction marks. There is no need to back space through one or more erroneous characters to make the correction.

There are many spatial arrangements in which the data may be recorded upon the record member. For example, the tape may be recorded on one-half, such as side A in FIG. 7, and then turned over to be recorded on side B. In this arrangement the reference mark track is centrally located, and the reference marks 92 recorded with the data on side A are erased by erase head 94 before data is recorded on side B. Reference marks 96 are then recorded along with the data characters on side B. For this and other arrangements it would be necessary to change the placement of the write heads to correspond to the desired data pattern. Also, readback may be accomplished by the use of a single permanent reference mark by providing a timing circuit which allows the data transfer gate to remain open for only a predetermined time after sensing the first reference mark.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A data recording system comprising in combination:
means for converting the data into a code manifestation and a control manifestation,
recording means comprising a data recording means, a reference means recording means and a reference means sensing means,
a record member having a reference means thereon,
scanning means for obtaining relative cyclical motion between said recording means and said record member, and
control means operable under control of coincidence between said control manifestation and sensing said reference means on said record member as said record member is scanned in the reverse order to energize said recording means in accordance with said code manifestation to record data and a new reference means on said record member.

2. A data recording system comprising in combination:
means for converting the data into a code manifestation and a control manifestation,
transducing means mounted for cyclical movement relative to a record member, said record member having a reference means thereon, said transducing means comprising a recording means for each of said code manifestations and said reference means and a means for sensing reference means on said record member,
control means operative under control of coincidence between said control manifestation and sensing said last reference means as the record member is read in the reverse order to energize said recording means in accordance with said code manifestation to record data on said record member, and
means to simultaneously energize said reference means transducing means to record a new reference means with said data.

3. A data recording system comprising in combination:
key means for converting the data into a code manifestation and a control manifestation,
a record member having a reference mark thereon,
recording means mounted for cyclical movement relative to a record member, said recording means comprising a transducer to record said code manifestation upon a predetermined portion of said record member, a transducer to record a reference mark on a reference portion of said record member, and a means for sensing a reference mark on said reference portion of said record member,
a control means operative for directing a control signal to energize said recording means in accordance with said code manifestation to record data on said data portion of said record member and a reference mark in the reference portion of said record member, said control signal being generated in response to the coincidence between said control manifestation and the sensing of a reference mark on the reference portion of said record member as the record is scanned in reverse order.

4. A data recording system comprising in combination:
key means for converting the data into a code manifestation, and a control manifestation,
a record member,
magnetic recording means comprising a magnetic transducer for writing said code manifestation upon a data portion of said record member and magnetic transducers for reading and writing data on a reference portion of said record member,
means for cyclically moving said magnetic recording means relative to said record member, and
a control means operative for directing a control signal to energize said magnetic recording means in accordance with said code manifestation to record data on said data portion of said record member, and to record a reference means upon the reference portion of said record member, said control signal being generated in response to the coincidence between said control manifestation and sensing a reference means on the reference portion of said record member when scanning the record member in the reverse order.

5. The method of recording data one character at a time on a record having entries composed of coded manifestations of data and a control manifestation comprising the steps of:
scanning the record in opposite sequence to that in which said entries are entered on said record member,
sensing the control manifestations on said record, and
recording a new entry on said record in response to coincidence between the sensing of the last recorded control manifestation and a control manifestation of the next data to be recorded.

6. A data recording system comprising in combination:
means for converting the data into a code manifestation and a control manifestation,
recording means comprising data recording means, a reference means sensing means and a reference means recording means, said reference means sensing means being spaced a predetermined distance from said data and said reference means recording means,
a record member having a reference means thereon,
scanning means for obtaining relative cyclical motion between said recording means and said record member, and
control means operable under control of coincidence between said control manifestation and sensing said reference means on said record member as said record member is scanned in the reverse order to energize said recording means in accordance with said code manifestation to record data and a reference means on said record member spaced by said predetermined distance from said previous reference means.

References Cited by the Examiner

UNITED STATES PATENTS

| | | | |
|---|---|---|---|
| 2,913,707 | 11/1959 | Goldberg et al. | 346—74 |
| 2,923,922 | 2/1960 | Blickensderfer | 340—174.1 |
| 3,063,040 | 11/1962 | Durkey et al. | 340—174.1 |

DARYL W. COOK, *Acting Primary Examiner.*

MALCOLM A. MORRISON, *Examiner.*

W. S. POOLE, R. COUNCIL, *Assistant Examiners.*